United States Patent
Mellin (10) Patent No.: US 10,167,847 B2
(45) Date of Patent: Jan. 1, 2019

(54) VERTICAL AXLE OR AXIS HELICALLY SWEPT BLADE WIND TURBINE

(71) Applicant: Per Gunnar Mellin, Gothenburg (SE)

(72) Inventor: Per Gunnar Mellin, Gothenburg (SE)

(73) Assignee: Per Mellin, Asensbruk, Vastra Gotaland (SE)

(*) Notice: Subject to any disclaimer, the term of this patent is extended or adjusted under 35 U.S.C. 154(b) by 0 days.

(21) Appl. No.: 15/080,392

(22) Filed: Mar. 24, 2016

(65) Prior Publication Data

US 2017/0276119 A1    Sep. 28, 2017

(51) Int. Cl.
*F03D 3/00* (2006.01)
*F03D 3/06* (2006.01)

(52) U.S. Cl.
CPC .......... *F03D 3/062* (2013.01); *F03D 3/005* (2013.01); *F05B 2220/30* (2013.01); *F05B 2240/211* (2013.01); *Y02E 10/74* (2013.01)

(58) Field of Classification Search
CPC ....... Y02E 10/74; F03D 3/061; F05B 2250/25
See application file for complete search history.

(56) References Cited

U.S. PATENT DOCUMENTS

| | | | | | |
|---|---|---|---|---|---|
| 8,905,706 B2* | 12/2014 | Bills | | F03D 1/0633 415/72 |
| 9,200,615 B2* | 12/2015 | Sarkar | | F03D 3/02 |
| 2009/0214339 A1* | 8/2009 | Poleacov | | F03B 3/121 416/1 |
| 2010/0090466 A1* | 4/2010 | Lyatkher | | F03B 13/264 290/54 |
| 2010/0244453 A1* | 9/2010 | Dornan | | F03D 9/00 290/55 |
| 2011/0027084 A1* | 2/2011 | Rekret | | F03D 3/02 416/126 |
| 2012/0076656 A1* | 3/2012 | Abass | | F03B 3/121 416/176 |
| 2012/0128500 A1* | 5/2012 | Perless | | F03D 3/061 416/223 R |
| 2012/0183407 A1* | 7/2012 | Vallejo | | F03D 3/061 416/228 |

FOREIGN PATENT DOCUMENTS

| | | | | |
|---|---|---|---|---|
| CH | 700422 B1 * | 8/2010 | | F03D 1/0608 |
| FR | 3048029 A1 * | 8/2017 | | F03D 3/061 |
| GB | 2495285 A * | 4/2013 | | F03B 17/06 |
| WO | WO-2015012752 A1 * | 1/2015 | | F03B 13/183 |

OTHER PUBLICATIONS

English abstract of CH 700422B1.*

* cited by examiner

*Primary Examiner* — Michael C Zarroli (57) ABSTRACT

The Vertical Axle or Axis Helically Swept Blade Wind Turbine, is by definition a vertical wind turbine using a blade or blades shaped as an uninterrupted spiral, with one side of the blade flat, the other side serving as an airfoil to create desired overall torque, all around its full swept turn, or integer number of full swept turns, using this the same cross section all along its stretch.

1 Claim, 12 Drawing Sheets

VERTICAL AXLE OR AXIS HELICALLY SWEPT BLADE WIND TURBINE

CROSS-REFERENCE TO RELATED APPLICATIONS

The inventor Mr. Per Mellin filed for pertinent provisional patent on Mar. 24, 2015, wherein some of the below description will also be found accordingly.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The field of invention pertinent to the Vertical Axle or Axis Helically Swept Blade Wind Turbine, is Wind Turbines, or more generally; Wind Power. The Background Art is Normal Horizontal Axle Wind Turbines, abbreviated HAWT. It has been shown from utilizing any HAWT that, no matter their efficiency generating electric power, they possess some disadvantages that could be solved, or at least be made less obvious, if using The Vertical Axle Or Axis, Helically Swept Blade Wind Turbine. The disadvantages, or problems, using HAWT appear in terms of generated extra noise whenever any of the turbine blades passes the often cylindrical tower upwind of the entire Horizontal Axle Wind Turbine, thus creating a very distinct fluttering sound. Moreover, in locations where the winds tend to change their directions now and then, any normal Horizontal Axle Wind Turbine, will have to change its direction to face the wind again accordingly. This changing of direction means loss of electric power produced, especially if wind directions tend to change rapidly and/or frequently, in terms of number of degrees changing. Furthermore, maintenance of any Horizontal Axle Wind Turbine very often means having to climb the cylindrical tower all the way up where most of the electric generator and pertinent control units are placed. This is both time consuming and hazardous.

Having made experiments using scale models of The Vertical Axle Or Axis, Helically Swept Blade Wind Turbine, indicate substantial increase in terms of electric power generated, related to the so called Projected Swept Area Against the Wind. Due to its shape made as a spiral, much less noise is generated by virtue of its smoother shape more evenly spread throughout its "area facing the winds".

Furthermore, there is no loss of electric power produced when wind directions are changing, something most Vertical Axle Wind Turbines have in common.

Maintenance is kept as low as possible by virtue of its more self-controlling appearance, read less need of control units, and of course by the fact that most of the electric generating machinery is kept on or very close to ground level, offering easier access to this.

BRIEF SUMMARY OF THE INVENTION

By definition, The Vertical Axle Or Axis, Helically Swept Blade Wind Turbine, is shaped as a spiral around its axle or imaginary axis, with two different shapes of each side of the blade, also known as an asymmetric blade. Preferably, the upper side of the blade is made flat, whereas the lower side is made as a symmetric wing profile, used as airfoil. This difference of shapes of both sides of the blade, create overall torque transferred to the physical axle, or to a toroid or flat ring-shaped bottom level, if using a stand-alone feature of spiraling wind turbine blade(s). Spokes and/or Streamlined Beams/Struts are to be used when using a physical axle.

The Vertical Axle Or Axis, Helically Swept Blade Wind Turbine, could be manufactured using similar materials as for Horizontal Axle Wind Turbines and their propeller blades, making them in suitable numbers of say, 90 degree sections of the spiral, connecting them on-site by fittings not protruding from the blade surfaces, when erecting this kind of wind turbine.

Advantages of the Vertical Axle or Axis, Helically Swept Blade Wind Turbine:

Simplicity, read cheaper to manufacture and to maintain increased overall output, compared to "the same projected area facing the wind" for HAWTs Wind Direction Independent, without losses when wind directions change Ease of Maintenance, due to ground level access to most of its components Self-Controlling by definition, bringing SW and Control Systems to a minimum More evenly generated low noise, due to its more evenly distributed appearance Economics, due to its earlier "Kick In" generating torque at relatively low wind speeds Security, due to its Self-Controlling virtues, having to heed hurricanes and above solely

BRIEF DESCRIPTION OF THE SEVERAL VIEWS OF THE DRAWING

To comply with prevailing US design requirements, the one-example-of-design efforts were being outsourced to Martinez & Turek, Inc., located in Rialto in southern California. It should be noted in FIG. 10 of the Drawing Material, referred to as Envelope Dimensions, that emphasis is given to the appearance of the Helically Swept Turbine Blade, pertinent physical Axle and its four Spokes (in this case), whereas the 180"×24" dimensions cylindrical foundation is of less importance in this context. Practically, the design of the foundation is of course extremely important, for it to secure the entire Helically Swept Blade Wind Turbine from falling, due to prevailing winds and harnessing of those per definition, but in this case, stressing the core of the very innovation per se, the foundation is "left as is"; a vital but not further described part.

Generally, it should also be noted, that the Drawing Material solely serves as one example of appearance, whereas Pitch of the Helically Swept Turbine Blade and/or the integer number of full turns and overall dimensions could vary, depending on desired Power Output, Wind Conditions etc.

The Drawings are showing;

FIG. 2 is showing First Angle Projection ISOMETRIC VIEW and Basic Components;

1) Helically Swept Wind Turbine Blade, 2) Axle, 3) Streamlined Struts, 4) Foundation

DETAILED DESCRIPTION OF THE VERTICAL AXLE OR AXIS, HELICALLY SWEPT BLADE WIND TURBINE INNOVATION

Figure 1:
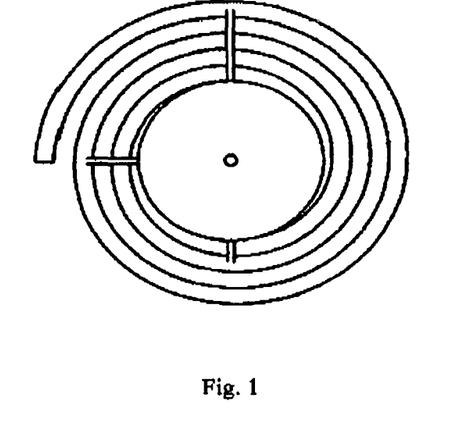
FIG. 1 is showing First Angle Projection BOTTOM VIEW
Figure 2:
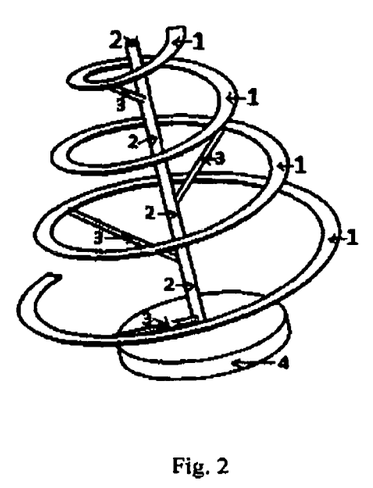
Figure 3:
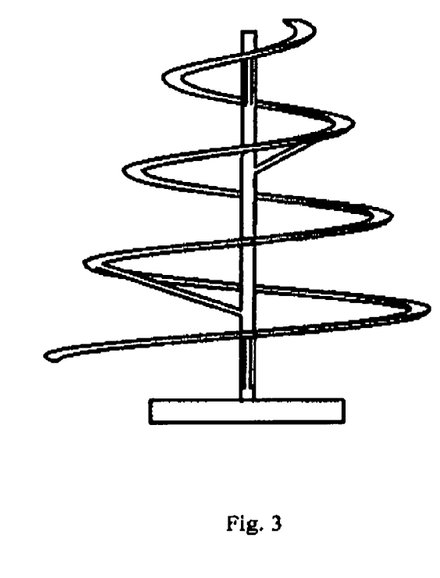
FIG. 3 is showing First Angle Projection FRONT VIEW
Figure 4:
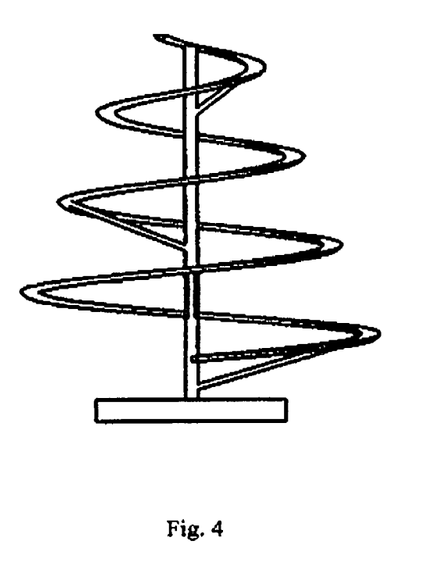
FIG. 4 is showing First Angle Projection LEFT VIEW
Figure 5:
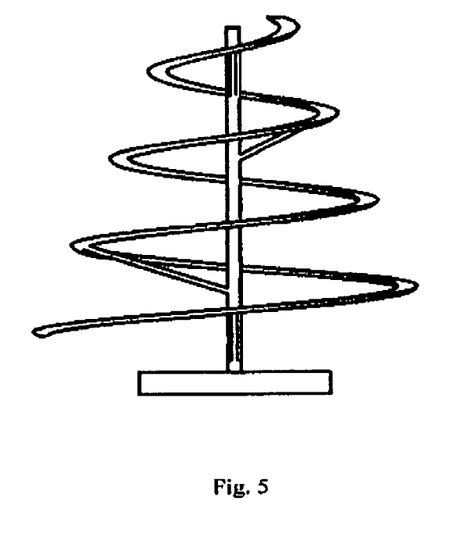
FIG. 5 is showing First Angle Projection FRONT VIEW
Figure 6:
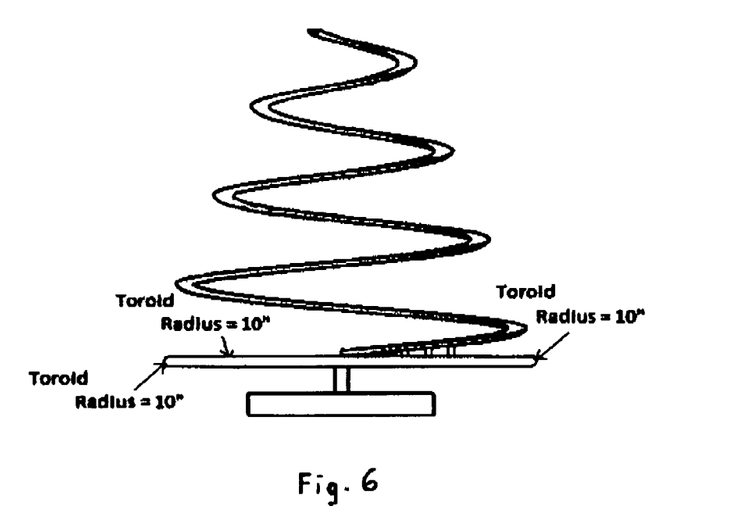
FIG. 6 is showing First Angle Projection LEFT VIEW
Figure 7:
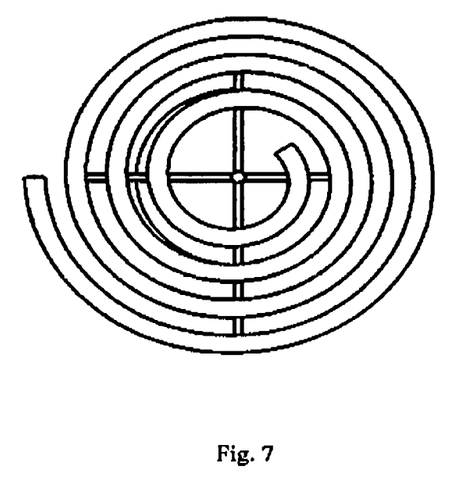
FIG. 7 is showing First Angle Projection TOP VIEW
Figure 8:
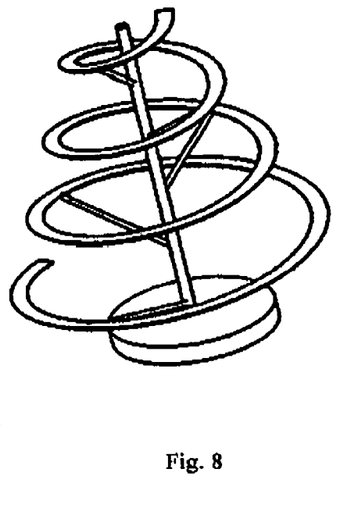
FIG. 8 is showing First Angle Projection ISOMETRIC VIEW
Figure 9:
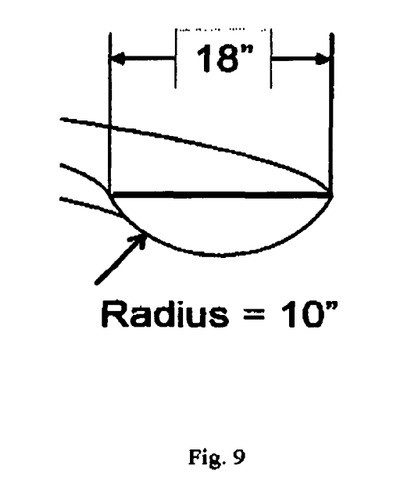
FIG. 9 is showing HELIX CROSS SECTION (suggested try-out version only)
Figure 10:
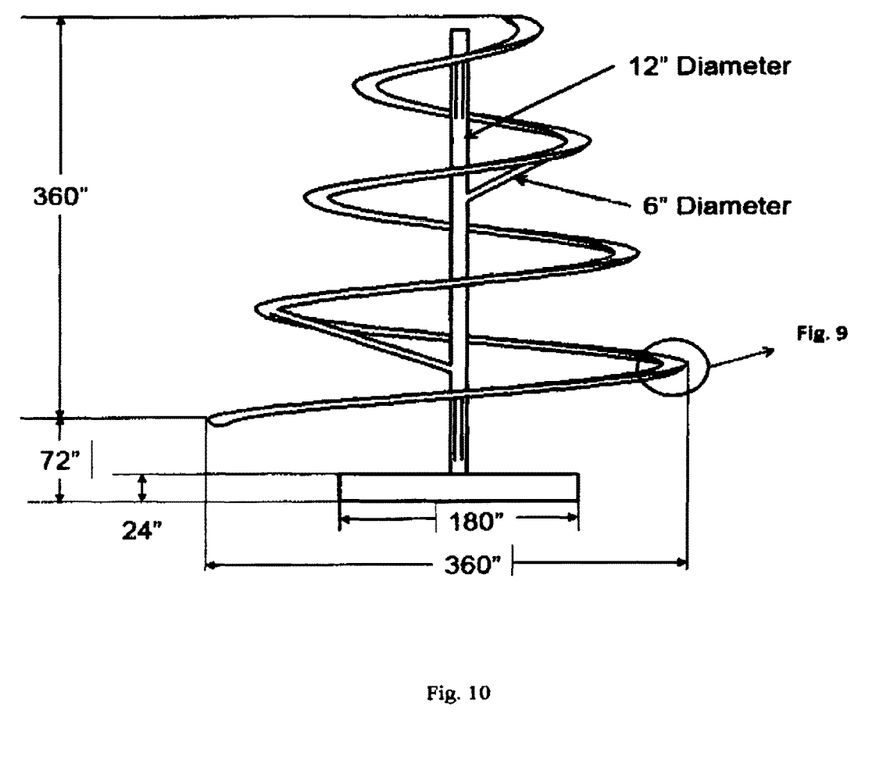
FIG. 10 is showing ENVELOPE DIMENSIONS (suggested try-out version only)

The Vertical Axle Or Axis, Helically Swept Blade Wind Turbine consists of ONE or SEVERAL helically swept Blade(s) that preferably has (have) its (their) flat side(s) facing upwards and its (their) airfoil side(s) facing downwards, in order to prevent Lift Forces from elevating this type of Wind Turbine off its foundation. Drawing FIG. 2 shows one blade marked as number 1, also known as an asymmetric blade, with its two differently shaped sides. However, if sufficiently secured, the opposite direction of flat- and airfoil sides respectively, would be possible.

The Vertical Axle Or Axis, Helically Swept Blade Wind Turbine BLADE MUST AT LEAST be swept ONE TURN, i.e. 360 degrees, around its either physical Axle, shown in Drawing FIG. 2 marked as number 2, or Imaginary Axis, in order to fully make use of its TRIPLE Different Major Feature Areas, and combination of those in between. Wind Direction is supposed to be coming FROM the viewer of the Principle View named Drawing FIG. 11, to be found in the Drawings Document.

Figure 11:
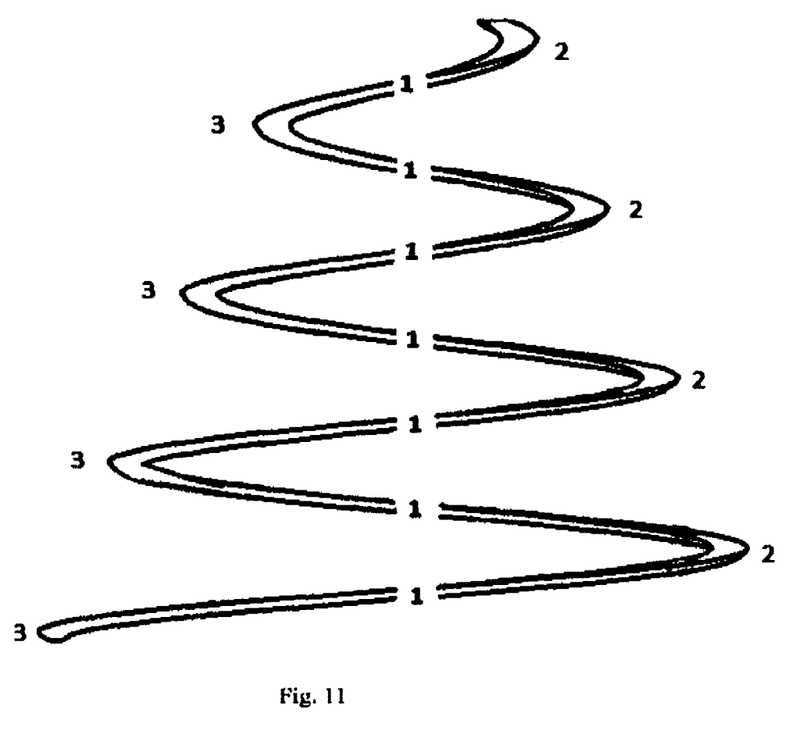
FIG. 11 is showing Principle View of the TRIPLE Different Major Feature Areas

The TRIPLE Different Major Feature Areas are when rotating around its axle or axis;
1) Perpendicular to the Wind Direction; Aerodynamic "Lift or Suction" turned TOURQUE,
2) Following the wind Dynamic Air Pressure; Adding to the overall Torque on the flat side of the Blade(s),
3) Facing the wind Drag produced; thus partially Self-Controlling its rotating speed, read rpm.

Obviously, the Electric Generator will also serve as means of Controlling the rotating speed, preferably letting the peripheral speed in Major Feature Area 2), to be slightly less than for ambient wind speed.

The Vertical Axle Or Axis, Helically Swept Blade Wind Turbine BLADE could also be made swept SEVERAL FULL TURNS, e.g. 4×360 degrees, around its either physical Axle or Imaginary Axis, thus similarly making use of its TRIPLE Different Major Feature Areas for each turn (i.e. 360 degrees), mentioned above. If using a SEVERAL FULL TURNS Wind Turbine BLADE, the overall feature could be slightly TAPERED (as a slight cone with its smallest diameter at the top) to allow produced Torque to become more evenly distributed all over its height, due to the fact that ambient wind speeds will probably be higher further up than closer to the ground level. Therefore, Tapered Helically Swept Blade(s) would probably be the most feasible solution in most cases. In rare situations where this type of Wind Turbines will be standing on "Hawaiian Pali alike cliffs", an up-side-down-tapered scenario could be used instead. In the case of using ONE turn (i.e. 360 degrees) BLADE(S) only, even this scenario could be slightly tapered for reasons mentioned above.

Figure 12:
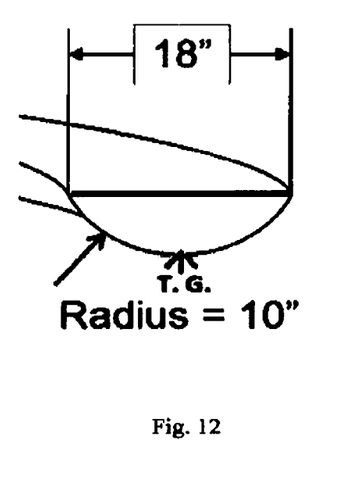
FIG. 12 is showing HELIX CROSS SECTION (with suggested position of Turbulence Generators; T.G.)

Blade Cross Section Profile:

The non-flat Airfoil side of The Overall Blade Cross Section Profile; the latter consisting of a Circle Segment or similar Airfoil, would preferably, but not necessary, be made as a Symmetric Wing Profile, due to manufacturing reasons and simplicity, with or without Turbulence Generators (T.G.). If using Turbulence Generators to yield desired and added turbulence vortices from its middle and thickest section of the airfoil side, this will generate extra "Lift or Suction", but will not be regarded mandatory, since the very airfoil side will create most of the overall Torque of The Vertical Axle Or Axis, Helically Swept Blade Wind Turbine anyways. Thus, the Turbulence Generators would serve as Efficiency Enhancement only. Measurements stated in the Helix Cross Section FIG. 12, to be found in the Drawings Document, solely serve as an example of dimensions. Due to the overall rotation when utilizing the winds to produce power, the "Resulting Wing Profile" will be less steep (i.e. smoother) than what the static cross section of the blade appears as (by using normal vector analysis).

Helical Sweep Pitch:

The Helical Sweep Pitch could vary from case to case, but an optimal pitch of circa 45 degrees is very likely, taken into account the overall Height of Wind Turbine, Desired Overall Torque, Use of Blade Material etc.

Physical Axle:

If using a Physical Axle, showed in Drawing FIG. 2 marked as number 2, this will have to be directly connected by means of streamlined beams/struts, showed in Drawing FIG. 2 marked as number 3, or spokes, or a combination of those, attached to the swept BLADE(s), then through a possible suitable Gear Box all the way to the Electric Generator on the ground level inside the Foundation, showed in Drawing FIG. 2 marked as number 4, OR connected through a traction driving the Electric Generator directly on a flywheel hub close to the ground level.

Imaginary Axis:

If using a Stand-Alone Structure with its obvious Imaginary Axis, this will have to be secured into a toroid or flat ring-shaped bottom level, connected to the Electric Generator close to the ground level by means of streamlined beams/struts or spokes, or a combination of those, OR connected through a traction driving the Electric Generator directly on a flywheel hub close to the ground level.

Advantages:
Simplicity, read cheaper to manufacture and to maintain
Increased overall output, compared to "the same projected area facing the wind" for HAWTs
Wind Direction Independent, without losses when wind directions change
Ease of Maintenance, due to ground level access to most of its components
Self-Controlling by definition, bringing SW and Control Systems to a minimum
More evenly generated low noise, due to its more evenly distributed appearance
Economics, due to its earlier "Kick In" generating torque at relatively low wind speeds
Security, due to its Self-Controlling virtues, having to heed hurricanes and above solely Disadvantages:
Using of suitably sized sections when assembling and erecting this type of Wind Turbine, unless being made of softer collapsible materials that could stiffen and/or congeal when getting ready to be used Manufacturing, Assembling and Greeting:

The Vertical Axle Or Axis, Helically Swept Blade Wind Turbine, could be manufactured using similar materials and shaping techniques as for Horizontal Axle Wind Turbines and their propeller blades, making the Helically Swept Blade in suitable numbers of say, 90 degree sections of the spiral, connecting them on-site by fittings not protruding from the blade surfaces, using appropriate scaffolding and ladders when erecting this kind of wind turbine.

Scale Models of this invention indicate pertinent advantages, described above, as well as a justification of suggested assembling and erecting methods above.

The invention claimed is:

1. A vertical axle helically swept blade wind turbine comprising:
    one or more uninterrupted helically swept blades, each blade stretching one or more full 360 degree turns around the vertical axis, in an overall tapered manner decreasing in diameter from the bottom of the axle to the top,
    the bottom of the axle is also the base circle and the top of the axle is also the end of the axle,
    the shape of each blade is flat on the major side facing upwards and airfoil shaped as a chord section on the opposite side;
    several aerodynamically shaped beams or spokes connect the axle with the blade or blades,
    the lower most base circle of the axle is a foundational toroid supporting the entire standalone device.

* * * * *